US006212200B1

(12) United States Patent
Iizuka et al.

(10) Patent No.: US 6,212,200 B1
(45) Date of Patent: Apr. 3, 2001

(54) DYNAMIC CONTROL SYSTEM FOR BANDWIDTH RESTRICTION VALUE OF NON-REAL TIME COMMUNICATIONS

(75) Inventors: Fumiyuki Iizuka; Masanobu Yuhara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/008,655

(22) Filed: Jan. 16, 1998

(30) Foreign Application Priority Data

Apr. 30, 1997 (JP) .................................... 9-112782

(51) Int. Cl.[7] ...................................... H04J 3/16
(52) U.S. Cl. ............................. 370/468; 370/465
(58) Field of Search ................... 370/229, 230, 370/231, 232, 235, 412, 464, 465, 468

(56) References Cited

U.S. PATENT DOCUMENTS

| 5,444,707 | * | 8/1995 | Cerna | 370/389 |
| 5,566,175 | * | 10/1996 | Davis | 370/468 |
| 5,802,310 | * | 9/1998 | Rajaraman | 370/232 |
| 5,898,670 | * | 4/1999 | Hoebeke | 370/468 |
| 6,009,473 | * | 12/1999 | Lowe | 370/231 |
| 6,055,577 | * | 4/2000 | Lee | 709/233 |
| 6,061,403 | * | 5/2000 | Marino | 375/240 |

FOREIGN PATENT DOCUMENTS 7-58744    3/1995    (JP) .

* cited by examiner

*Primary Examiner*—Douglas Olms
*Assistant Examiner*—Ricardo M. Pizarro
(74) *Attorney, Agent, or Firm*—Staas & Halsey LLP

(57) ABSTRACT

The non-real time (NRT) bandwidth collector unit in a master apparatus collects the bandwidth of the non-real time (NRT) communications beforehand by decreasing the bandwidth limit value of a non-real time (NRT) queue in the client apparatus with a light traffic of a non-real time (NRT) communications. When the traffic of the non-real time (NRT) communications increases and there is a shortage of the bandwidth in a certain client apparatus, an increase request for the bandwidth is sent from the client apparatus to the master apparatus. The non-real time (NRT) bandwidth distributor unit in the master apparatus redistributes a new bandwidth limit value within the range of the collected bandwidth. The new bandwidth limit value is notified from the master apparatus to the client apparatus by a non-real time (NRT) bandwidth notifier unit and is set therein.

13 Claims, 11 Drawing Sheets

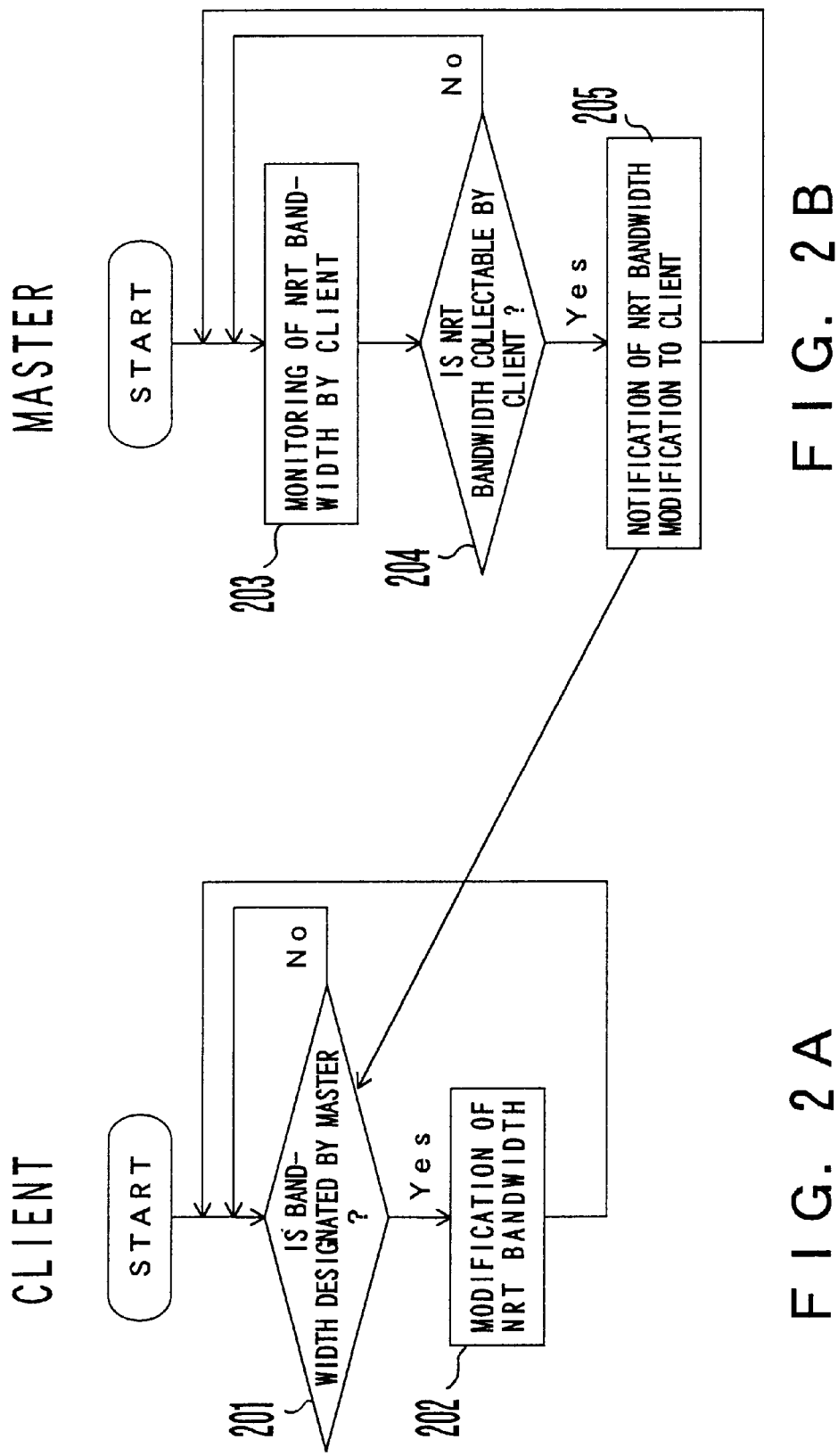

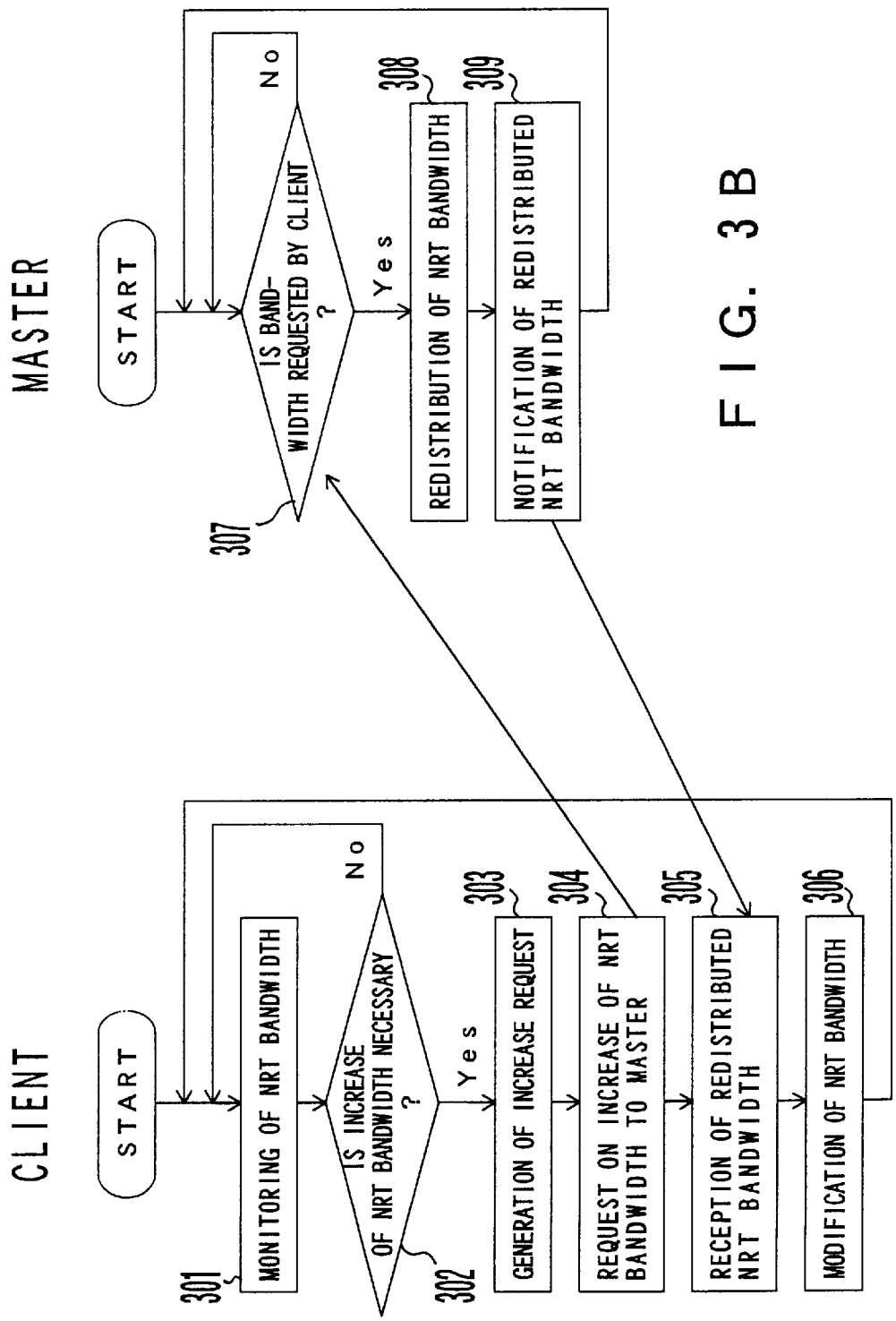

DYNAMIC CONTROL SYSTEM FOR BANDWIDTH RESTRICTION VALUE OF NON-REAL TIME COMMUNICATIONS

BACKGROUND OF THE INVENTION

1. Field of the Invention

The present invention relates to a technology for combining real time communications which processes multimedia data, etc., with non-real time communications which processes other data, and controlling the combination in a network such as a packet network, etc., and more particularly to a technology for effectively performing non-real time communications in which a bandwidth is restricted, on a network where resources are reserved with higher priority for real time communications and where its bandwidth is to be secured.

2. Description of the Related Art

When multimedia applications for performing communications of multimedia data such as audio data and video data are used on a network such as a packet network, etc., and when the transfer of these data are delayed due to heavy traffic on the network, users feel disturbed, since the continuity of sound and pictures is interrupted. To prevent this situation it is important that the bandwidth of real time communications is guaranteed on a network for processing multimedia data.

Conventionally, a technology is known to guarantee the bandwidth of the real time communications for preferentially assigning network resources to the real time communications for processing multimedia data, etc., by restricting the use of the network resources by the non-real time communications.

In fact, the bandwidth determined by subtracting the bandwidth assigned for the real time communications from that assigned for the whole network is assigned to each node apparatus. Each node apparatus restricts the bandwidth of the non-real time communications in such a way this bandwidth does not exceed the bandwidth which is assigned to each node apparatus.

However, the above-described prior art is not originally provided with a means for estimating necessary bandwidth based on the current used status of the non-real time communications and for updating the bandwidth limit value of the non-real time communications of each node apparatus according to the current used status. As a result, in the above-described prior art, since the non-real time communications cannot use the network resources effectively, a status occurs in which the delay of transfer of the non-real time communications increases, etc., which makes users feel disturbed when the used status of the non-real time communications by users changes. This is a problem of the prior art.

Although a method for deciding the assignment of the network resources based on its used result by observing the used status of the non-real time communications over a long period of time, is considered to be a method for estimating necessary bandwidth based on the current used status of the non-real time communications, this method has the problem that the network resources cannot be effectively assigned when the non-real time communications having strong data burst characteristics, occur.

Even if a means by which the occurrences of the non-real time communications having strong data burst characteristics are detected and even if the reassignment of the bandwidth of the non-real time communications can be requested based on it, a heavy traffic is caused on the network when the bandwidth of the non-real time communications is reassigned to all the node apparatuses at the time of the occurrence of the request for its reassignment. This increases the load of each node apparatus composing the network and causes the functioning of the network to deteriorate. This is another problem of the prior art.

SUMMARY OF THE INVENTION

The present invention is made in the above-described background. It is an object of the present invention to realize a means by which the bandwidth limit value of each node apparatus can be immediately updated when traffic occurs which exceeds its bandwidth limit value, and when the increase of its allowable bandwidth is required.

The present invention is based on a communications system for securing the necessary bandwidth of real time communications by transferring the packets of the non-real time communications through a queue (NRT queue 110) and by adjusting the bandwidth of the non-real time communications.

First, one of a plurality of node apparatuses on the network is operated as a master apparatus (master apparatus 101), while the other node apparatuses and/or the master apparatus itself are operated as client apparatuses (client apparatus 102).

Then, the communications system comprises a non-real time communications status monitor unit (NRT communications status monitor unit 107), and a non-real time communications bandwidth request unit (request generator unit 108 and NRT bandwidth request unit 109).

The non-real time communications status monitor unit monitors the used status of the bandwidth of the non-real time communications in the queue of the client apparatus. For example, when the current output bandwidth in the queue reaches its bandwidth limit value set for the queue, the non-real time communications status monitor unit calculates an increment of the bandwidth of the non-real time communications according to the total packet length or the remaining time length of the packets remaining in the queue. For example, when the current output bandwidth in the queue reaches its bandwidth limit value set for the queue, and when the packet whose length is restricted by a size of a window is not remaining in the queue, the non-real time communications status monitor unit calculates an increment of the bandwidth of the non-real time communications, according to the total packet length of the packets remaining in the queue. When the current output bandwidth in the queue reaches its bandwidth limit value set for the queue, and when the packet whose length is restricted by a size of a window, is remaining in the queue, it calculates the increment of the bandwidth of the non-real time communications according to a value obtained by adding a value corresponding to the window control to the total packet length of the packets remaining in the queue. Or, for example, when the current output bandwidth in the queue reaches its bandwidth limit value set for the queue, the non-real time communications status monitor unit calculates an increment of the bandwidth of the non-real time communications according to the input bandwidth of the queue.

Next, when the non-real time communications status monitor unit judges that it is necessary to increase the bandwidth of the non-real time communications, the non-real time communications bandwidth request unit send outs a request for increasing the bandwidth of the non-real time communications to the master apparatus.

The master apparatus further comprises a non-real time communications bandwidth collector unit 104, a non-real time communications bandwidth reassignment unit 105, and a non-real time communications bandwidth notifier unit 106.

The non-real time communications bandwidth collector unit decreases the bandwidth limit value of the queue inside a client apparatus in which the current bandwidth in the queue is less than the bandwidth limit value set for the queue, by regularly inquiring the use status of the bandwidth in each non-real time communications status monitor unit in each client apparatus, and at the same time stores the decreased value as a collected bandwidth.

Then, when the non-real time communications bandwidth distributor unit has received an increase request for the non-real time communications bandwidth from the non-real time communications bandwidth request unit in any client apparatus, it redistributes a new bandwidth limit value corresponding to the increase request within the range of the collected bandwidth stored by the non-real time communications bandwidth collector unit.

Then, the non-real time communications bandwidth notifier unit notifies the client apparatus which sent out the increase request and sets it to the new bandwidth limit value which is reassigned by the non-real time communications bandwidth reassignment unit.

In the above-described way, the master apparatus collects the bandwidth of the non-real time communications in the client apparatus in which the used volume of the non-real time communications is small and when there is any shortage in bandwidth or when there is any shortage in its bandwidth due to the increase of the used volume of the non-real time communications in the client apparatus, the master apparatus can reassign the collected bandwidth to the client apparatus immediately. As a result, the bandwidth of the non-real time communications can be reassigned both effectively and rapidly.

BRIEF DESCRIPTION OF THE DRAWINGS

The present invention will be more apparent from the following detailed description in conjunction with the accompanying drawings, in which:

FIGS. 2A and 2B are flowcharts showing the operation of a bandwidth collecting process.

FIGS. 3A and 3B are flowcharts showing the operation of a bandwidth request process.

DESCRIPTION OF THE PREFERRED EMBODIMENTS

The detailed preferred embodiments of the invention are described below with reference to the accompanying drawings.

In the description and drawings below, "NRT" stands for non-real time communications.

Figure 1:
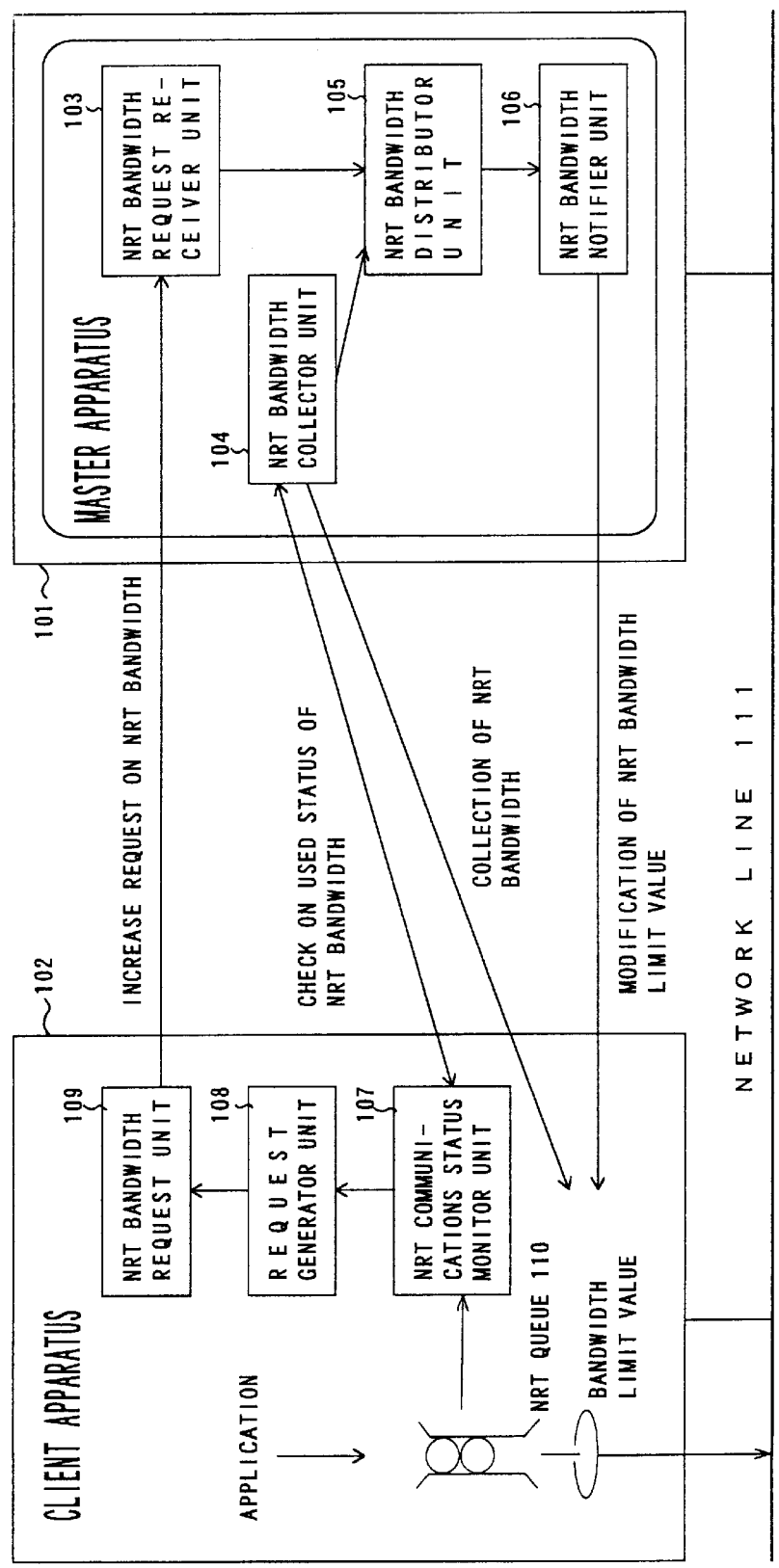
FIG. 1 is a block diagram showing the configuration of the preferred embodiment of the invention.

FIG. 1 is a block diagram showing the configuration of the preferred embodiment of the invention. For example, among a plurality of node apparatuses which are interconnected with each other by a network line 111, for example, the Ethernet, one is determined to operate as the master apparatus 101, and the other node apparatuses operate as client apparatuses 102. The master apparatus 101 itself also operates as a client apparatus 102.

The client apparatus 102 outputs the packets, generated by the applications which perform real time communications among the packets generated by a plurality of applications executed on it, to the network line 111 (or hold in the queues for the real time communications which have higher priority than the NRT queue). The client apparatus 102 holds the packets generated by an application for performing non-real time communications in an NRT queue 110 (NRT output waiting queue) and outputs them while executing a bandwidth restriction process for the packets held in the NRT queue 110. In this way, the bandwidth of real time communications for processing multimedia data, etc. can be preferentially secured.

The packets generated by an application for real time communications and the packets generated by an application for non-real time communications are, for example, discriminated from each other by their IP addresses (Internet Protocol addresses), their transport protocol Nos. and port Nos. which are added to the header portions of the packets.

The master apparatus 101 controls the bandwidth of non-real time communications for each client apparatus 102. This control includes the collecting process of the bandwidth of non-real time communications and the receiving process of the bandwidth increase request for non-real time communications.

First, the collecting process of the bandwidth of non-real time communications is described below based on the flowcharts shown in FIGS. 2A and 2B.

The NRT communications status monitor unit 107 in the client apparatus 102 monitors the used status of the bandwidth of non-real time communications in the NRT queue 110 according to each of various methods, to be described later.

On the other hand, the NRT bandwidth collector unit 104 in the master apparatus 101 monitors the used status of the bandwidth of non-real time communications in the each client apparatus 102 by regularly (for example, every few minutes) inquiring to the NRT communications status monitor unit 107 in each client apparatus 102 (step 203 in FIG. 2B).

The NRT bandwidth collecting unit 104 judges whether or not the bandwidth of non-real time communications can be collected in each client apparatus 102, based on its monitor result (step 204 in FIG. 2B).

As a result of this judgement, when the current bandwidth of the NRT queue 110 in a certain client apparatus 102 is less than the bandwidth limit value set for the queue, that is, when non-real time communications is not performed so much in the client apparatus 102, the NRT bandwidth collector unit 104 in the master apparatus 101 notifies the client apparatus 102 that it modifies the bandwidth limit value for the NRT queue 110 to a smaller value and collects the bandwidth of the non-real time communications from the client apparatus 102 (When the judgement in step 204 is Yes, flow advances to step 205, then returns to step 203). The NRT bandwidth collector unit stores the above-described decrement of the bandwidth as a collected bandwidth.

On the other hand, the client apparatus which has received the above-described modification notice, (Yes in step S201), modifies the bandwidth of the non-real time communications set in the NRT queue 110 to the notified value (step 202).

As a result, the bandwidth occupied by the packet of the non-real time communications sent out to the network line 111 by the client apparatus 102, the non-real time communications bandwidth of which is collected, decreases.

Next, the process where the master apparatus receives an increase request for non-real time communications bandwidth from a client apparatus is described below based on the two flowcharts shown in FIGS. 3A and 3B.

As described above, in FIG. 3A, the NRT communications status monitor unit 107 in a client apparatus 102 judges whether or not it is necessary to increase the bandwidth of non-real time communications (step 302) while monitoring the used status of the non-real time communications in the NRT queue 110 (step 301).

Then, when the NRT communications status monitor unit 107 judges that it is necessary to increase the bandwidth of non-real time communications, (step 302 is Yes), the request generator unit 108 generates an increase request for the non-real time communications bandwidth which has stored the requested increased volume for the non-real time communications obtained in the monitor result of the NRT communications status monitor unit 107 (step 303), and the NRT bandwidth request unit 109 outputs the request to the master apparatus 101 (step 304).

In the master apparatus 101 its NRT bandwidth request receiver unit 103 receives the request and notifies its NRT bandwidth reassignment unit 105 of this request (the judgement of step 307 is Yes).

When the request is notified, the NRT bandwidth reassignment unit 105 reassigns the bandwidth of the non-real time communications to the client who has sent out the request within the range of the collected band width controlled by the NRT bandwidth collector unit 104 according to said request when it is notified (step 308).

When the NRT bandwidth reassignment unit 105 is notified of a plurality of requests at the same time by a plurality of client apparatuses 102, and when the total necessary bandwidth exceeds the collected bandwidth controlled by the NRT bandwidth collector unit 104, the NRT bandwidth reassignment unit 105, for example, reassigns the collected bandwidth to each client apparatus 102 in the ratio of the bandwidth requested by each client apparatus 102.

The client apparatus 102 can be structured so that its bandwidth is requested in units such as the necessity degree of increasing the bandwidth, instead of the bandwidth being designated directly in said request, and so that the NRT bandwidth reassignment unit 105 can reassign a bandwidth according to the necessity degree.

Then, an NRT bandwidth notifying unit 106 notifies the client apparatus 102 which sent out the request of the above-reassigned bandwidth of the non-real time communications (step 309).

When the client apparatus 102 receives the reassigned bandwidth of the non-real time communications from the master apparatus 101 (step 305), it modifies the bandwidth limit value of the NRT queue (step 306). Flow then returns to step 301.

As a result of this control, when the non-real time communications bandwidth of a certain client apparatus 102 is collected in a network line 111 such as the Ethernet, etc., where the total volume of the non-real time communications bandwidth is fixed, the bandwidth of non-real time communications which the client apparatus 102 uses on the network line 111 decreases. The client apparatus 102 can secure more of the bandwidth for non-real time communications on the network line 111, because the collected bandwidth for it is reassigned to another client apparatus 102 which is sending out an increase request on the bandwidth of the non-real time communications.

In this way, by collecting in advance the bandwidth of the non-real time communications in the client apparatus 102 in which the use frequency of non-real time communications is small, the master apparatus 101 can reassign the collected bandwidth to the client apparatus 102 promptly, when the used frequency of non-real time communications increases in a certain client apparatus 102, and when there is any shortage in its bandwidth. As a result, the bandwidth of non-real communications can be reassigned both effectively and rapidly.

Next, four examples of control methods in the NRT communications status monitor unit 107 are described below in order.

Figure 4A:
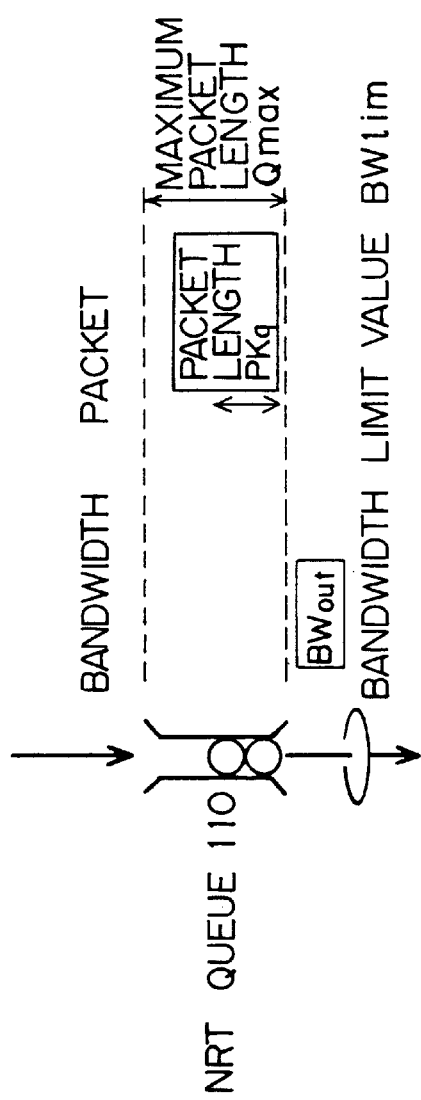
FIGS. 4A and 4B are diagrams showing the operation of the first embodiment of the NRT communications status monitor unit.
Figure 4B:
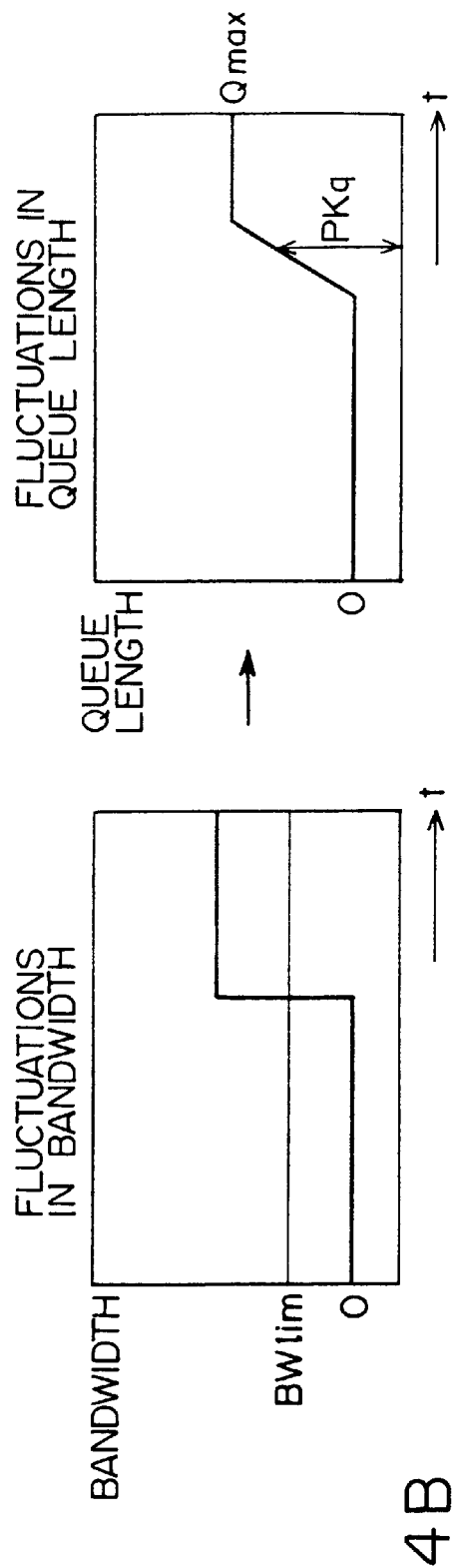

First, FIGS. 4A and 4B are diagrams showing the operation for the first embodiment of the controlling methods of the NRT communications status monitor unit 107.

In this first embodiment, as shown in FIG. 4A, the NRT communications status monitor unit 107 estimates the necessary bandwidth of non-real time communications by comparing the current output bandwidth BWout in the NRT queue 110 with a bandwidth limit value BWlim, as well as monitoring the total packet length PKq remaining in the NRT queue 110.

FIG. 4B shows the relation between the fluctuations in bandwidth with time and the corresponding fluctuations in the total packet length PKq. Here, if the current output bandwidth BWout reaches the bandwidth limit value BWlim in the NRT queue 110, the total packet length PKq of the NRT queue 110 increases, because packets remain in the NRT queue 110. The maximum value of this total packet length PKq becomes the queue capacity Qmax of the NRT queue 110.

In the first embodiment, when the current output bandwidth BWout reaches the bandwidth limit value BWlim, the necessity of increasing the bandwidth limit value BWlim for the NRT queue 110 increases, and it can be judged that this necessity further increases as the total packet length PKq increases beyond a certain threshold value.

On the other hand, when the state BWout<BWlim continues for a certain period in the first embodiment, the bandwidth limit value BWlim set in the NRT queue 110 is reduced by the NRT bandwidth collector unit 104 in the master apparatus 101. When BWout=BWlim, and when the threshold value<PKq≦Qmax, the increment of the bandwidth limit value BWlim corresponding to the total packet length PKq is decided by the NRT communications status monitor unit 107. The increment is requested to the NRT bandwidth request receiver unit 103 in the master apparatus 101 through the request generator unit 108 and NRT bandwidth request unit 109. Furthermore, the new bandwidth limit value BWlim corresponding to the increment set by the NRT band notifier unit 106 in the master apparatus 101 is set in the NRT queue 110 in a client apparatus 102.

Figure 5:
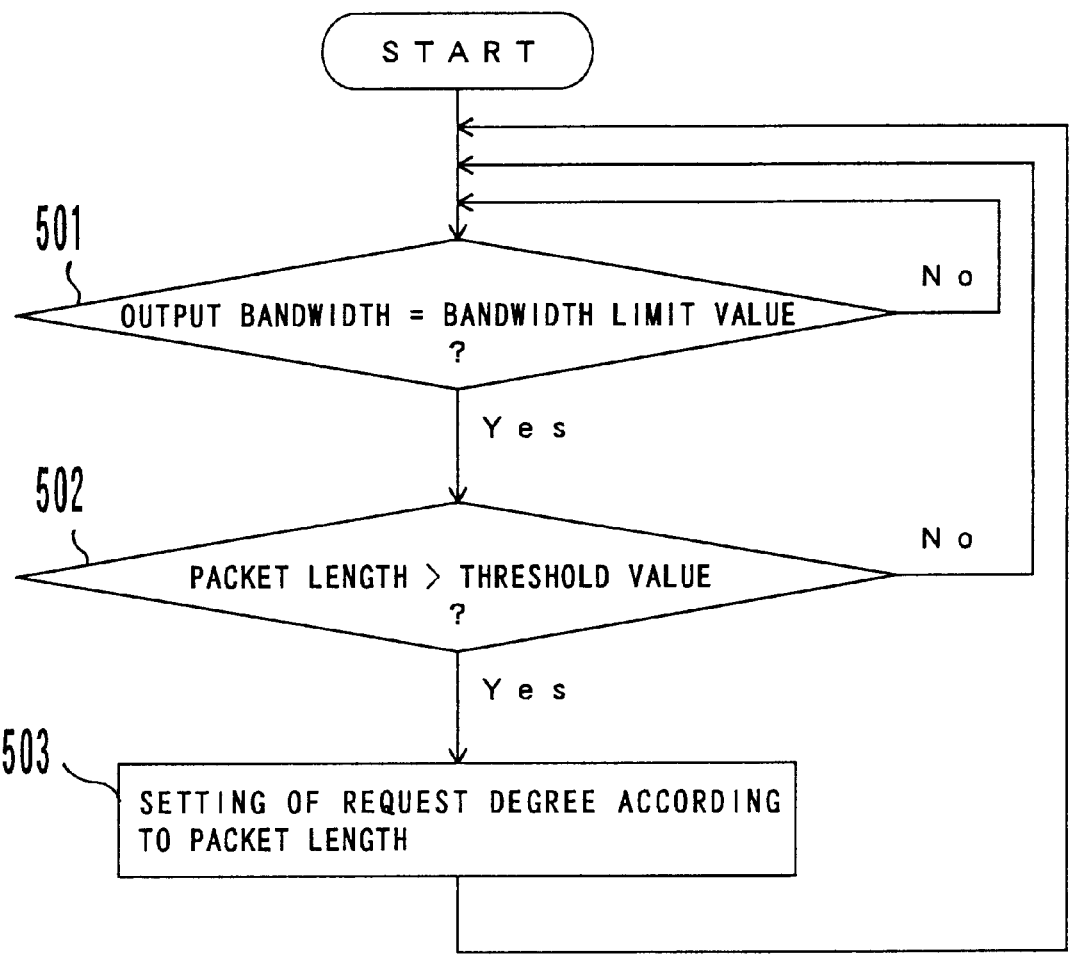
FIG. 5 is a flowchart showing the operation of the first embodiment of the NRT communications status monitor unit.

FIG. 5 is a flowchart showing the operation for realizing the control method of the NRT communications status monitor unit 107.

First, the NRT communications status monitor unit 107 monitors whether or not the current output bandwidth BWout reaches the bandwidth limit value BWlim set in the NRT queue 110 (step 501).

Then, when the output bandwidth BWout reaches the bandwidth limit value BWlim, (the judgement of step 501 is YES), the NRT communications status monitor unit 107 monitors whether or not the total packet length PKq in the NRT queue 110 exceeds the predetermined threshold value (step 502).

When the total packet PKq exceeds the predetermined threshold value, (the judgement of step 502 is YES), the NRT communications status monitor unit 107 calculates the increment of the bandwidth limit value BWlim corresponding to the total packet PKq and notifies the result to the request generator unit 108 (step 503). Flow then returns to step 501.

Figure 6A:
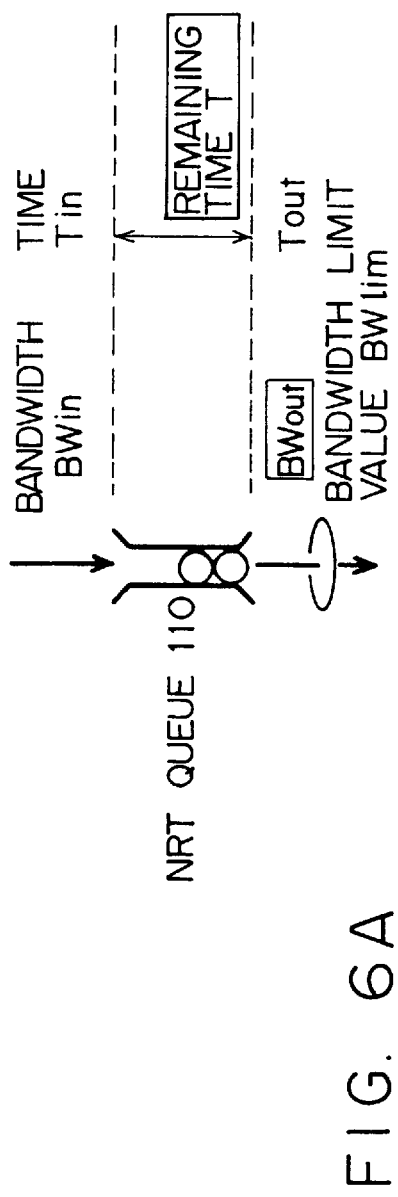
FIGS. 6A and 6B are diagrams showing the operation of the second embodiment of the NRT communications status monitor unit.
Figure 6B:
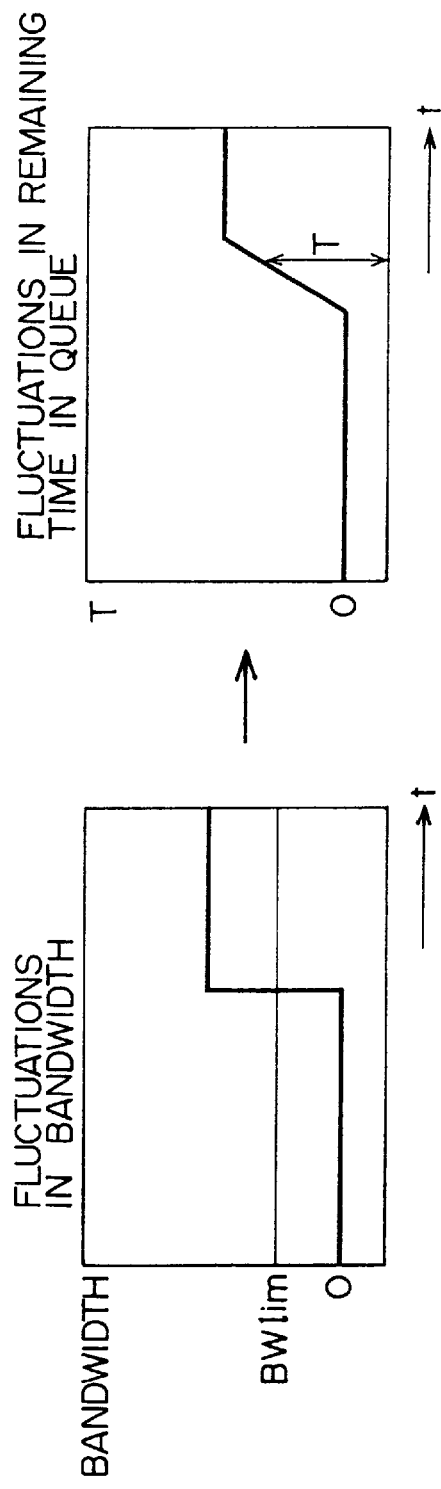

FIGS. 6A and 6B are drawings showing the operation of the second embodiment of the control method of the NRT communications status monitor unit 107.

In this second embodiment, the NRT communications status monitor unit 107 estimates the necessary bandwidth of non-real time communications by comparing the current output bandwidth BWout in the NRT queue 110 with a bandwidth limit value BWlim, as well as monitoring the remaining time T of packets in the NRT queue 110 as shown in FIG. 6A.

FIG. 6B shows the relation between the fluctuations in bandwidth with time and the corresponding remaining time T of packets. Here, if the current output bandwidth BWout reaches the bandwidth limit value BWlim in the NRT queue 110, the remaining time T of packets in the NRT queue 110 increases.

In the second embodiment, when the current output bandwidth BWout reaches the bandwidth limit value BWlim, the necessity of increasing the bandwidth limit value BWlim for the NRT queue 110 increases, and it can be judged that this necessity further increases as the remaining time T of the packets increases beyond a certain threshold value.

On the other hand, when the state BWout<BWlim continues for a certain period in the second embodiment, the bandwidth limit value BWlim set in the NRT queue 110 is reduced by the NRT bandwidth collector unit 104 in the master apparatus 101. When BWout=BWlim, and when the threshold value<T, the increment of the bandwidth limit value BWlim corresponding to the remaining time T of the packets is decided by the NRT communications status monitor unit 107. The increment is requested to the NRT bandwidth request receiver unit 103 in the master apparatus 101 through the request generator unit 108 and NRT bandwidth request unit 109. Furthermore, the new bandwidth limit value BWlim corresponding to the increment set by the NRT band notifier unit 106 in the master apparatus 101 is set in the NRT queue 110 in a client apparatus 102.

Figure 7:
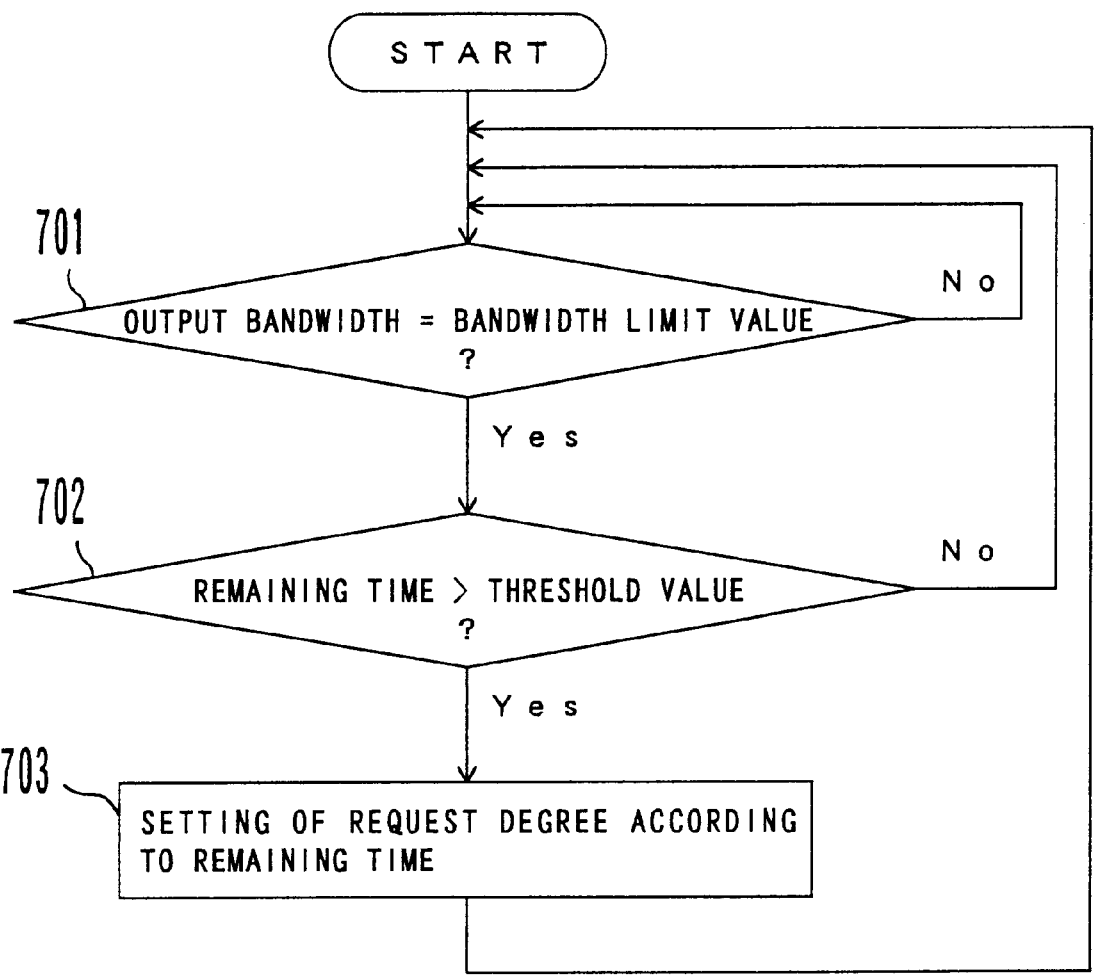
FIG. 7 is a flowchart showing the operation of the second embodiment of the NRT communications status monitor unit.

FIG. 7 is a flowchart showing the operation for realizing the control method of the NRT communications status monitor unit 107.

First, the NRT communications status monitor unit 107 monitors whether or not the current output bandwidth BWout reaches the bandwidth limit value BWlim set in the NRT queue 110 (step 701).

Then, when the output bandwidth BWout reaches the bandwidth limit value BWlim, (the judgement of step 701 is YES), the NRT communications status monitor unit 107 monitors whether or not the remaining time T of each packet in the NRT queue 110 exceeds the predetermined threshold value (step 702). Here, the remaining time T of each packet is the value which can be obtained by subtracting the time when each packet has been queued in the NRT queue 110, from the time when the packet has been output from the queue. The NRT communications status monitor unit 107 may be structured not so as to monitor the remaining time T for each packet, but to calculate the average of the remaining time T of a plurality of packets, and monitor this average time.

When the remaining time T exceeds the predetermined threshold value, (the judgement of step 702 is YES), the NRT communications status monitor unit 107 calculates the increment of the bandwidth limit value BWlim corresponding to the remaining time T and notifies the result to the request generator unit 108 (step 703). Flow then returns to step 701).

Figure 8A:
FIGS. 8A and 8B are diagrams showing the operation of the third embodiment of the NRT communications status monitor unit.
Figure 8B:
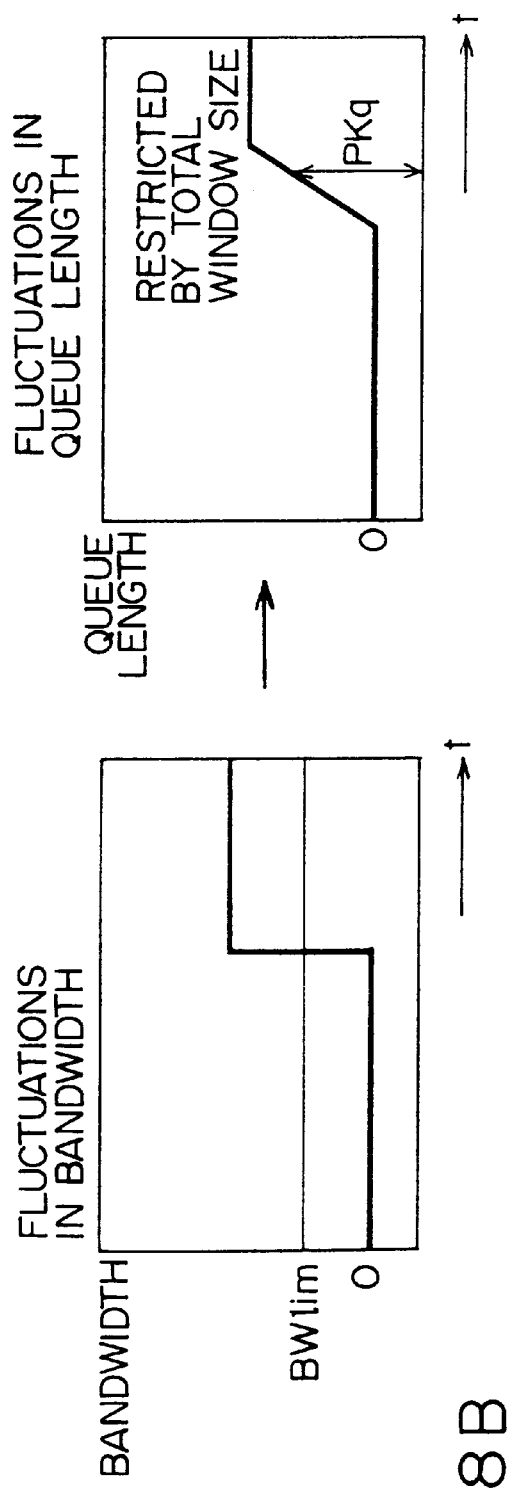

FIGS. 8A and 8B are drawings showing the operation of the third embodiment of the control method of the NRT communications status monitor unit 107.

In the case of the stream whose output is restricted by a window used in TCP (Transfer Control Protocol) communications, etc., the packet length of this stream is restricted by the window size. In such a case, if the necessary bandwidth of the non-real time communications is estimated simply based on the total packet length PKq in the NRT queue 110, the resultant quantity is less than the actual requirement. As a result, it may occur that even if a new bandwidth limit value BWlim based on the estimated necessary bandwidth is set in the NRT queue 110, the output bandwidth BWout cannot reach the current actual requirements and a further request for an increase in bandwidth becomes necessary.

For this reason, in the third embodiment the NRT communications status monitor unit 107 estimates the necessary bandwidth of non-real time communications by comparing the current output bandwidth BWout in the NRT queue 110 with the bandwidth limit value BWlim, as well as monitoring whether or not the packets of the stream whose output is restricted by a size of a window in the NRT queue 110, as shown in FIG. 8A.

FIG. 8B shows the relation among the fluctuations in bandwidth with time and the corresponding fluctuations in the total packet length PKq and the restriction by a size of a window. Here, if the current output bandwidth BWout reaches the bandwidth limit value BWlim in the NRT queue 110, the total packet length PKq in the NRT queue 110 increases. When the number of packets of the stream whose output is restricted by a size of a window remain in the NRT queue 110, the maximum value of this total packet length PKq becomes the packet length corresponding to the size of the window. And when the number of packets of such stream does not remain, it becomes the queue capacity Qmax of the NRT queue 110.

On the other hand, in the third embodiment, when the state BWout<BWlim continues for a certain period, the bandwidth limit value BWlim set in the NRT queue 110 is reduced by the NRT bandwidth collector unit 104 in the master apparatus 101. When BWout=BWlim, and when there is no restriction set by a window, the increment of the bandwidth limit value BWlim corresponding to the total packet length PKq is decided by the NRT communications status monitor unit 107. On the other hand, when BWout=BWlim and when there is a restriction set by a size of a window, an increment of the bandwidth limit value BWlim corresponding to a value obtained by adding an experiential adjusting value to the total packet length PKq, is decided by the NRT communications status monitor unit 107. This increment is requested to the NRT bandwidth request receiver unit 103 in the master apparatus 101 through the request generator unit 108 and NRT bandwidth request unit 109. Furthermore, the new bandwidth limit value BWlim corresponding to the increment set by the NRT band notifier unit 106 in the master apparatus 101 is set in the NRT queue 110 in a client apparatus 102.

Figure 9:
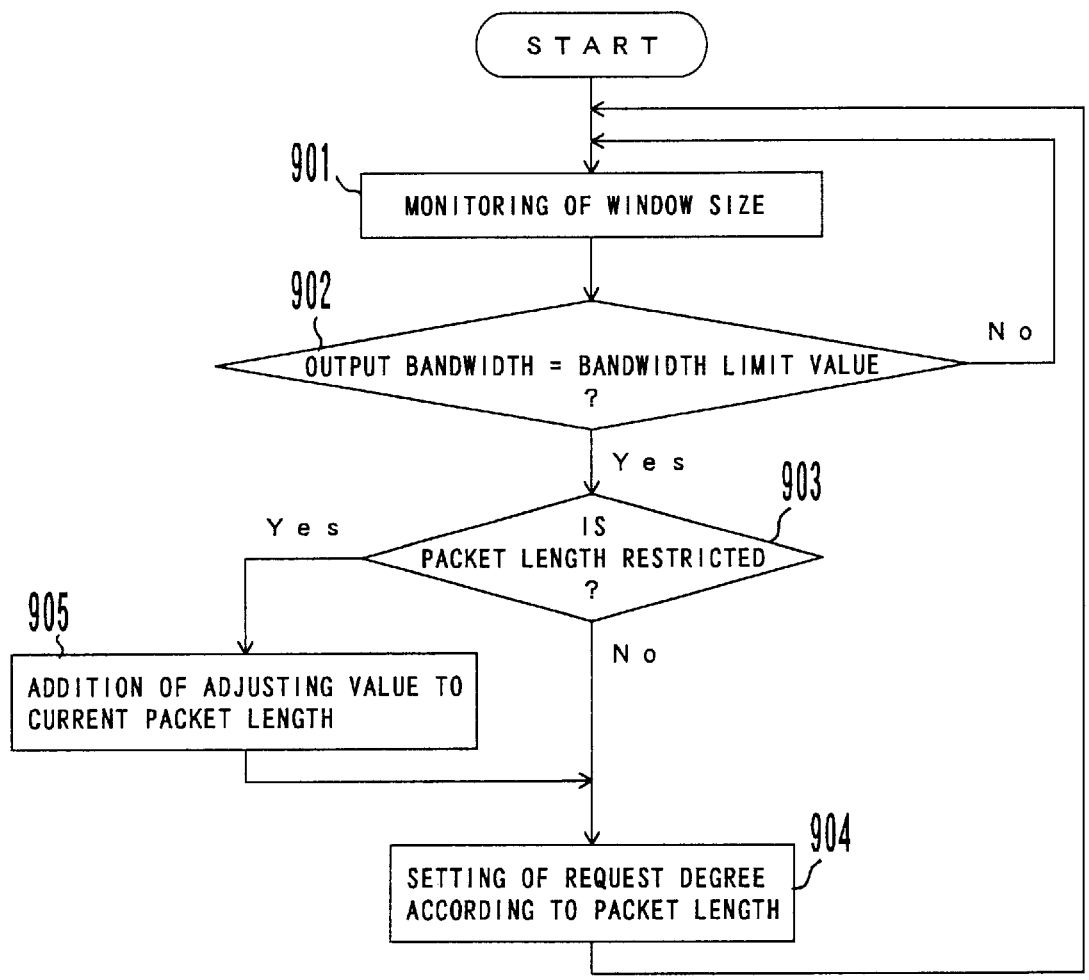
FIG. 9 is a flowchart showing the operation of the third embodiment of the NRT communications status monitor unit.

FIG. 9 is a flowchart of the operation for realizing the control method of the NRT communications status monitor unit 107.

First, the NRT communications status monitor unit 107 monitors the window size set in each packet remaining in the NRT queue 110 (step 901).

Then, the NRT communications status monitor unit 107 monitors whether or not the current output bandwidth BWout of the NRT queue 110 reaches the bandwidth limit value BWlim set in the NRT queue 110 (step 902).

When the output bandwidth BWout reaches the bandwidth limit value BWlim, (the judgement of step 902 is YES), the NRT communications status monitor unit 107 judges whether or not the length of any packet remaining in the NRT queue 110 is restricted by a window, based on the monitor result of step 901 (step 903).

If the length of any packet remaining in the NRT queue 110 is not restricted by a window, (the judgement of step 903 is NO), the NRT communications status monitor unit 107 calculates the increment of the bandwidth limit value BWlim corresponding to the total packet length PKq in the current NRT queue 110 and notifies the result to the request generator unit 108 (step 904). Flow then returns to step 901.

On the other hand, if the length of any packet remaining in the NRT queue 110 is restricted, (the judgement of step 903 is NO), the NRT communications status monitor unit 107 adds a predetermined adjusting value α to the total packet length PKq in the current NRT queue 110 (step 905). Then, the NRT communications status monitor unit 107 calculates the increment of the bandwidth limit value BWlim corresponding to the addition result obtained in the step 905, and notifies the result to the request generator unit 108 (step 904). Flow then returns to step 901.

The NRT communications status monitor unit may be structured so as to separately monitor a window size for every packet in the NRT queue corresponding to each stream and to decide the increment of the bandwidth based on each window size.

Figure 10A:
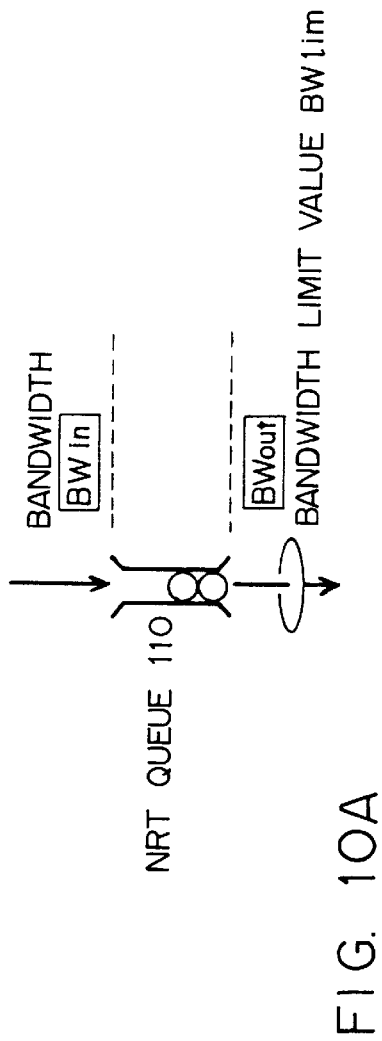
FIGS. 10A and 10B are diagrams showing the operation of the fourth embodiment of the NRT communications status monitor unit.
Figure 10B:
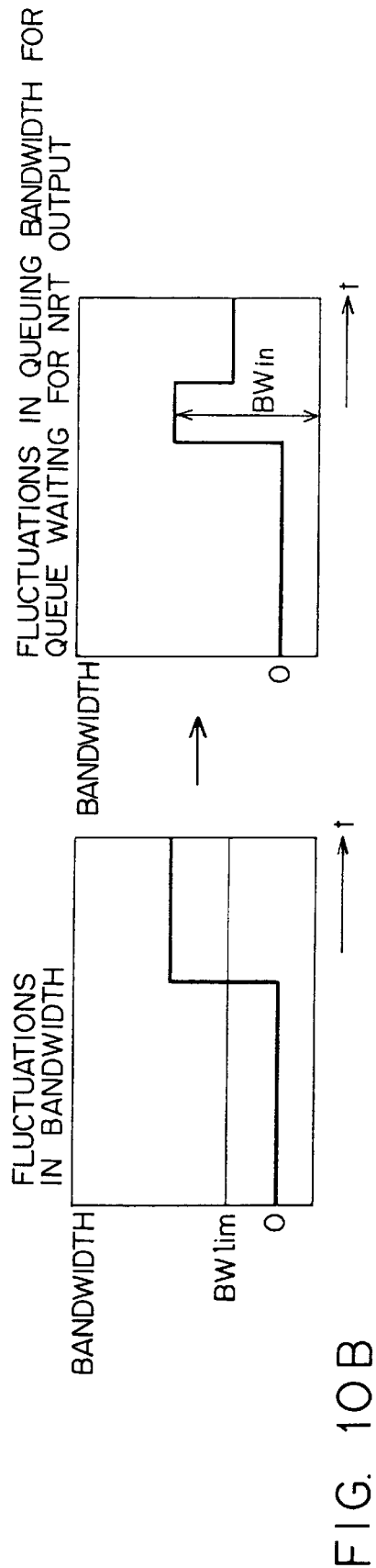

FIGS. 10A and 10B are drawings showing the operation of the fourth embodiment of the control method of the NRT communications status monitor unit 107.

In the fourth embodiment the NRT communications status monitor unit 107 estimates the required bandwidth of non-real time communications by comparing the current output bandwidth BWout in the NRT queue 110 with the bandwidth limit value BWlim, as well as monitoring the input bandwidth BWin of a packet in the NRT queue 110.

FIG. 10B shows the relation between the fluctuations in bandwidth with time and the corresponding fluctuations in the input bandwidth BWin. Here, even if the input bandwidth BWin exceeds the bandwidth limit value BWlim set in the NRT queue 110, the queuing of a packet with the input bandwidth BWin continues until the NRT queue is full.

In the fourth embodiment, when the current output bandwidth BWout reaches the bandwidth limit value BWlim, the necessity of increasing the bandwidth limit value BWlim for the NRT queue 110 increases, and then it can be judged that this necessity increases according to the input bandwidth BWin.

On the other hand, in the fourth embodiment, when the state BWout<BWlim continues for a certain period, the bandwidth limit value BWlim set in the NRT queue 110 is reduced by the NRT bandwidth collector unit 104 in the master apparatus 101. When BWout=BWlim, the increment of the bandwidth limit value BWlim corresponding to the input bandwidth BWin is decided by the NRT communications status monitor unit 107. The increment is requested to the NRT bandwidth request receiver unit 103 in the master apparatus 101 through a request generator unit 108 and NRT bandwidth request unit 109. Furthermore, a new bandwidth limit value BWlim corresponding to the increment set by the NRT band notifier unit 106 in the master apparatus 101 is set in the NRT queue 110 in the client apparatus 102.

Figure 11:
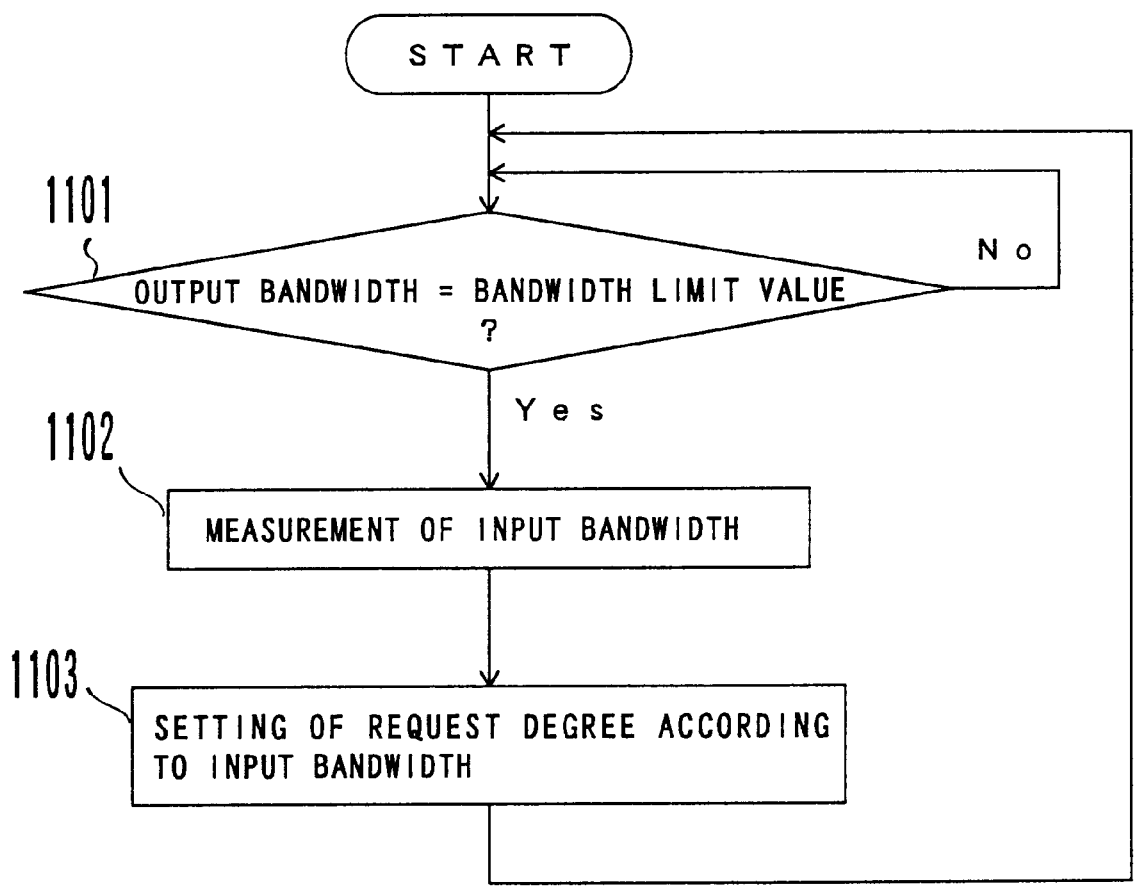
FIG. 11 is a flowchart showing the operation of the fourth embodiment of the NRT communications status monitor unit.

FIG. 11 is a flowchart of the operation for realizing the control method of the NRT communications status monitor unit 107.

First, the NRT communications status monitor unit 107 monitors whether or not the current output bandwidth BWout of the NRT queue 110 reaches the bandwidth limit value BWlim set in the NRT queue 110 (step 1101).

Then, when the output bandwidth BWout reaches the bandwidth limit value BWlim, (the judgement of step 1101 is YES), the NRT communications status monitor unit 107 measures the input bandwidth BWin in the NRT queue 110 (step 1102).

The NRT communications status monitor unit 107 calculates the increment of the bandwidth limit value BWlim corresponding to the input bandwidth measured in step 1102, and notifies the result to the request generator unit 108 (step 1103). Flow then returns to step 1101.

What is claimed is:

1. A communications system for securing the bandwidth of real time communications by transferring the packet of non-real time communications through a queue and adjusting the bandwidth of said non-real time communications, wherein one of a plurality of node apparatuses on the network is operated as a master apparatus and at the same time other node apparatuses and/or said master apparatus are operated as client apparatuses, and wherein a client apparatus comprises:

a non-real time communications status monitor unit to monitor the used status of said non-real time communications bandwidth of the said queue in said client apparatus; and a non-real time communications bandwidth request unit to send out an increase request on non-real time communications bandwidth to said master apparatus when said non-real time communications status monitor unit has judged that it is necessary to increase said non-real time communications bandwidth, and wherein said master apparatus comprises:

a non-real time communications bandwidth collector unit to decrease the bandwidth limit value of the queue inside said client apparatus in which the current bandwidth in said queue is less than said bandwidth limit value set for said queue, by regularly inquiring the use status of the bandwidth in each non-real time communications status monitor unit in each client apparatus and at the same time controlling the decreased value as a collected bandwidth;

a non-real time communications bandwidth distributor unit to redistribute a new bandwidth limit value corresponding to an increase request within the range of said collector bandwidth controlled by said non-real time communications band collector unit when it has received an increase request for said non-real time communications bandwidth from said non-real time communications bandwidth request unit in any of said client apparatuses; and a non-real time communications bandwidth notifier unit to notify said client apparatus which has sent out said increase request of said new bandwidth limit value redistributed by said non-real time communications bandwidth distribution unit and setting it.

2. The communications system according to claim 1, wherein when the current output bandwidth in said queue reaches said bandwidth limit value set for said queue, said non-real time communications monitor unit calculates the increment of said non-real time communications bandwidth according to the total length of the packets remaining in said queue.

3. The communications system according to claim 1, wherein when the current output bandwidth in said queue reaches said bandwidth limit value set in said queue, said non-real time communications monitor unit calculates the increment of said non-real time communications bandwidth according to the remaining time of the packets remaining in said queue.

4. The communications system according to claim 1, wherein said non-real time communications status monitor unit calculates the increment of said non-real time communications bandwidth according to the total packet length of the packets remaining in said queue when the current output bandwidth in said queue reaches said bandwidth limit value set for said queue and when the packet with the packet length which is restricted by a window dose not exist in said queue; and calculates the increment of said non-real time communications bandwidth according to the value obtained by adding a value corresponding to said window control and the total packet length of the packet remaining in said queue when the current output bandwidth in said queue reaches said bandwidth limit value set for said queue and when the packet with the packet length which is restricted by a window exists said queue.

5. The communications system according to claim 1, wherein when the current output bandwidth in said queue reaches said bandwidth limit value set for said queue, said non-real time communications monitor unit calculates the increment of said non-real time communications bandwidth according to the input bandwidth of said queue.

6. A client apparatus in a communications system, said communications system for securing the bandwidth of real time communications by transferring a packet of non-real time communications through a queue and adjusting the bandwidth of said non-real time communications, wherein one of a plurality of node apparatuses on the network is operated as a master apparatus and at the same time other node apparatuses and said master apparatus itself are operated as client apparatuses, a client apparatus comprising:

a non-real time communications status monitor unit to monitor the used status of said non-real time communications bandwidth of said queue in said client apparatus; and a non-real time communications bandwidth request unit to send out an increase request for non-real time communications bandwidth to said master apparatus when said non-real time communications status monitor unit has judged that it is necessary to increase said non-real time communications bandwidth.

7. The apparatus according to claim 6, wherein when the current output bandwidth in said queue reaches said bandwidth limit value set for said queue, said non-real time communications monitor unit calculates the increment of said non-real time communications bandwidth according to the total length of the packets remaining in said queue.

8. The apparatus according to claim 6, wherein when the current output bandwidth in said queue reaches said bandwidth limit value set for said queue, said non-real time communications monitor unit calculates the increment of said non-real time communications bandwidth according to the remaining time of the packets remaining in said queue.

9. The apparatus according to claim 6, wherein said non-real time communications status monitor unit calculates the increment of said non-real time communications bandwidth according to the total packet length of the packets remaining in said queue when the current output bandwidth in said queue reaches said bandwidth limit value set for said queue and when the packet with the packet length which is restricted by a window does not exist in said queue; and calculates the increment of said non-real time communications bandwidth according to the value obtained by adding a value corresponding to said window control and the total packet length of the packet remaining in said queue when the current output bandwidth in said queue reaches said bandwidth limit value set for said queue and when the packet with the packet length which is restricted by a window existed in said queue.

10. The apparatus according to claim 6, wherein when the current output bandwidth of said queue reaches said bandwidth limit value set for said queue, said non-real time communications monitor unit calculates the increment of said non-real time communications bandwidth according to the input band of said queue.

11. A master apparatus in a communications system, said communications system for securing the bandwidth of real time communications by transferring the packets of non-real time communications through a queue and adjusting the bandwidth of said non-real time communications, wherein one of a plurality of node apparatuses on the network is operated as a master apparatus and at the same time other node apparatuses and said master apparatus itself are operated as client apparatuses, said master apparatus comprising:

a non-real time communications bandwidth collector unit to decrease the bandwidth limit value of the queue inside a client apparatus in which the current bandwidth in said queue is less than said bandwidth limit value set for said queue, by regularly inquiring the use status of the bandwidth in each non-real time communications status monitor unit in each client apparatus and at the same time controlling the decreased value as a collected bandwidth;

a non-real time communications bandwidth distributor unit to redistribute a new bandwidth limit value corresponding to an increase request within the range of said collector bandwidth controlled by said non-real time communications band collector unit when it has received an increase request for said non-real time communications bandwidth from said non-real time communications bandwidth request unit in any one of said client apparatuses; and a non-real time communications bandwidth notifier unit to notify said client apparatus which has sent out said increase request of said new bandwidth limit value redistributed by said non-real time communications bandwidth distribution unit and setting it.

12. A recording medium in a communications system for securing the bandwidth of real time communications by transferring the packets of non-real time communications through a queue and adjusting the bandwidth of said non-real time communications, wherein one of a plurality of node apparatuses on the network is operated as a master apparatus and at the same time other node apparatuses and said master apparatus itself are operated as client apparatuses, which can be read by a client apparatus, and on which is recorded a program for realizing the functions of:

monitoring the used status of said non-real time communications bandwidth of said queue in said client apparatus; and sending out an increase request for non-real time communications bandwidth to said master apparatus when said non-real time communications status monitor unit has judged that it is necessary to increase said non-real time communications bandwidth.

13. A recording medium in a communications system for securing the bandwidth of real time communications by transferring the packets of non-real time communications through a queue and adjusting the bandwidth of said non-real time communications, wherein one of a plurality of node apparatuses on the network is operated as a master apparatus and at the same time other node apparatuses and said master apparatus itself are operated as client apparatuses, which can be read by a client apparatus, and on which is recorded a program for realizing the functions of:

decreasing the bandwidth limit value of the queue inside said client apparatus in which the current bandwidth in said queue is less than said bandwidth limit value set for said queue, by regularly inquiring the use status of the bandwidth in each non-real time communications status monitor unit in each client apparatus and at the same time controlling the decreased value as a collected bandwidth;

redistributing a new bandwidth limit value corresponding to an increase request within the range of said collector bandwidth controlled by said non-real time communications band collector unit when it has received an increase request for said non-real time communications bandwidth from said non-real time communications bandwidth request unit in any one of said client apparatuses; and notifying said client apparatus which has sent out said increases request of said new bandwidth limit value redistributed by said non-real time communications bandwidth distribution unit and setting it.

* * * * *